March 28, 1961     M. WIESNER     2,976,989
LIGHT-TIGHT FILM PACKS FOR DAYLIGHT DEVELOPMENT
Filed Aug. 28, 1956
FIG.1
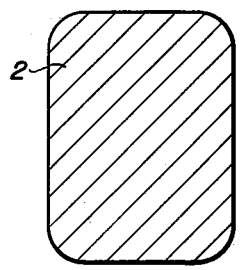
FIG.2
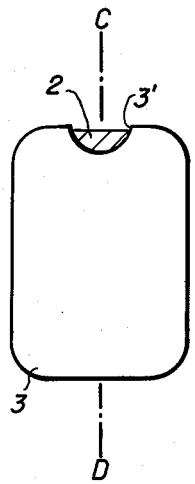
FIG.3
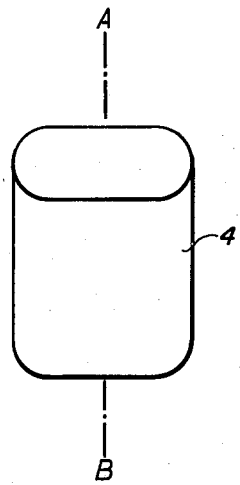
SECTION A-B
FIG.5
SECTION C-D
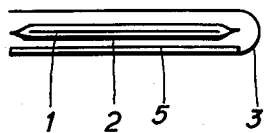
FIG.4
INVENTOR.
MAX WIESNER
BY Connolly and Hutz
his ATTORNEYS

United States Patent Office 2,976,989
Patented Mar. 28, 1961

2,976,989

LIGHT-TIGHT FILM PACKS FOR DAYLIGHT DEVELOPMENT

Max Wiesner, Leverkusen, Germany, assignor to Agfa Aktiengesellschaft, a corporation of Germany Filed Aug. 28, 1956, Ser. No. 606,620

Claims priority, application Germany Sept. 28, 1955

3 Claims. (Cl. 206—62)

This invention relates to light-tight film packs for daylight development.

It is known to cover the light-sensitive material, more especially for X-ray exposures, with a material which is previous to photographic treatment baths but is impermeable to light, one example of such a covering being blotting paper. The making of this semi-pervious covering light-tight does however present difficulties. Furthermore, for improving such packs, an X-ray film pack has been proposed which is provided with a substantially light-tight covering which is pervious to X-rays and liquids in which the film is to be treated after exposure, an inner sheath being arranged between the film and the liquid-permeable covering in such manner that the said sheath can be extracted without light having access to the film. For example, a sheet of non-pervious paper folded to cover the film on both sides is inserted into the semi-pervious covering at one open end, the said paper being removed just prior to development. This constructional form has the disadvantage that light can very easily penetrate, during this manipulation, into the pack which is open at one end.

According to the invention, a better degree of light-tightness is produced by a film pack in which the film is enclosed in a semi-permeable and substantially light-tight sheath, the latter being additionally enclosed in a folded sheet of light-tight paper or plastic and packed in an outer sheath in the form of an envelope consisting of water-repelling, light-impervious material.

The semi-pervious paper covering is preferably closed at the free edges by sticking, felting, milling, beading or the like.

The folded paper or plastic sheet can contain light-absorbing dyestuffs or light-impervious substances for the purpose of increasing the light-fastness.

In cases where an intensifying foil must not lie in direct contact with the film, an intensifying foil, for example a lead foil, is arranged on one side of the fold and if necessary is fixed thereon. With X-ray dental films, for example, the lead foil also serves as protection against radiation. In this case there may be also applied other metal foils, such as an aluminium foil.

A water-repelling, impervious material is used as the outer sheath, such as for example impregnated or lined paper or plastic, such as polyethylene. Any desired shape which is known per se and which is usual for wrapping purposes can be chosen for the outer sheath. For example, it is possible to use a pocket which is open at one end.

After the film has been exposed, it is very easy for the user to take a film with the semi-pervious covering quickly out of the outer pocket in subdued daylight without any danger of direct exposure and place it in a daylight development tank.

A film pack according to the invention is illustrated by way of example in the accompanying drawings.

Figure 1 is a view of the light-tight covering enclosing the film;

Figure 2 is a view of the light-tight covering enclosing the film of Fig. 1 positioned within a fold of light-tight sheet material;

Figure 3 is a view of the outer sheath enclosing the assembly of Fig. 2;

Fig. 4 is a section taken along C—D of Fig. 2; and

Figure 5 is a section taken along line A—B of Fig. 3.

In the figures, a film 1 is shown enclosed in an airtight sheath 2 which is pervious to common photographic developing solutions. The film and enclosing sheath are further protected by a fold of light-tight material 3 positioned around and over the film-sheath assembly. A cut-out 3' is provided, as shown in Figure 2, in the sheet material forming the fold to enable a user to remove the film-sheath assembly from the fold 3. An outer envelope 4 encloses the film-sheath-fold assembly. As seen in the section views 4 and 5, the fold 3 used in the assembly has a lead foil 5 positioned adjacent one of the inner faces so that it lies adjacent the sheath 2 covering the film 1. The lead foil serves both as an intensifying foil and a radiation shield.

I claim:

1. A photographic package comprising an inner sheath completely enclosing a light-sensitive photographic material, said inner sheath being inserted within a light-opaque intermediate enclosure, said intermediate enclosure being inserted within an outer cover which is impervious to both water and light, said inner sheath being completely sealed about said photographic material and being made from a material which is substantially light-tight and inherently semi-permeable to usual photographic film-treating baths to permit said sheath to remain in protective relationship about said photographic material while and during the time that it is inserted into said film-treating bath thereby minimizing the time required for the transfer from said package to said bath and permitting said substantially light-tight material to completely protect said photographic material from light because of the brief time required for such transfer, and said intermediate enclosure being provided with a metal foil along one side thereof.

2. A photographic package comprising an inner sheath completely enclosing a light-sensitive photographic material, said inner sheath being inserted within a light-opaque intermediate enclosure, said intermediate enclosure being inserted within an outer cover which is impervious to both water and light, said inner sheath being completely sealed about said photographic material and being made from a material which is substantially light-tight and inherently semi-permeable to usual photographic-film treating baths to permit said sheath to remain in protective relationship about said photographic material while and during the time that it is inserted into said film-treating bath thereby minimizing the time required for the transfer from said package to said bath and permitting said substantially light-tight material to completely protect said photographic material from light because of the brief time required for such transfer, and said inner sheath being made of blotting paper.

3. A photographic package comprising an inner sheath completely enclosing a light-sensitive photographic material, said inner sheath being inserted within a light-opaque intermediate enclosure, said intermediate enclosure being inserted within an outer cover which is impervious to both water and light, said inner sheath being completely sealed about said photographic material and being made from a material which is substantially light-tight and inherently semi-permeable to usual photographic film-treating baths to permit said sheath to remain in protective relationship about said photographic material while and during the time that it is inserted into said film-treating bath thereby minimizing the time required for the transfer from said package to said bath and permitting said substantially light-tight material to completely protect said photographic material from light because of the brief time required for such transfer, said intermediate enclosure being open ended, said outer cover having an open end positioned remote from the open end of said intermediate enclosure and incorporating a flap connected to one side of its open end, and said flap overlapping the opposite side of said open end of said outer cover to make said package absolutely light and moisture proof.

References Cited in the file of this patent

UNITED STATES PATENTS

| | | |
|---|---|---|
| 1,367,601 | Hodgson | Feb. 8, 1921 |
| 1,560,993 | Hohmann | Nov. 10, 1925 |
| 1,563,362 | Herradora | Dec. 1, 1925 |
| 1,840,908 | Lozier et al. | Jan. 12, 1932 |
| 2,144,453 | Flynn | Jan. 17, 1939 |
| 2,656,772 | Kurnick et al. | Oct. 27, 1953 |